US007089013B2

(12) United States Patent
Taur et al.

(10) Patent No.: US 7,089,013 B2
(45) Date of Patent: Aug. 8, 2006

(54) BUSINESS MODEL OF THE CO-LOCATING SCHEME OF LOW EARTH ORBIT (LEO) AND GEOSTATIONARY (GEO) SATELLITE SYSTEMS

(75) Inventors: Roger R. Taur, San Jose, CA (US); Ted Mitsuteru Sugiki, Kanagawa (JP); Hiroyuki Okamoto, Kanagawa (JP)

(73) Assignee: Astro Research Corporation (JP)

( * ) Notice: Subject to any disclaimer, the term of this patent is extended or adjusted under 35 U.S.C. 154(b) by 0 days.

(21) Appl. No.: 10/896,185

(22) Filed: Jul. 20, 2004

(65) Prior Publication Data

US 2006/0030261 A1    Feb. 9, 2006

(51) Int. Cl.
*H04Q 7/20*    (2006.01)
*H04B 7/185*    (2006.01)

(52) U.S. Cl. ............... 455/446; 455/448; 455/12.1; 455/13.2; 342/352

(58) Field of Classification Search ............... 455/446, 455/448, 12.1, 13.2; 342/352
See application file for complete search history.

(56) References Cited

U.S. PATENT DOCUMENTS

| 5,193,056 | A  |   | 3/1993  | Boes |
| 6,007,027 | A  | * | 12/1999 | Diekelman et al. ..... 244/158 R |
| 6,257,526 | B1 | * | 7/2001  | Taormina et al. ....... 244/158 R |
| 6,336,612 | B1 | * | 1/2002  | Taormina et al. ....... 244/158 R |

* cited by examiner

*Primary Examiner*—Edan Orgad
(74) *Attorney, Agent, or Firm*—Boris G. Tankhilevich

(57) ABSTRACT

A method of incrementally increasing a revenue stream generated by an incrementally built satellite communication system comprising the following steps: (A) planning an initial constellation phase of the satellite communication system to cover an initial predetermined coverage area; (B) building the initial number of satellites for the initial constellation phase of the satellite communication system; (C) launching each satellite to fill the initial constellation phase of the satellite communication system; and (D) collecting an initial revenue stream generated by the initial constellation phase of the satellite communication system. The initial constellation phase of the satellite communication system comprises an initial number of satellites and is substantially completed to carry an initial communication traffic for the initial predetermined coverage area. The initial revenue stream can be used for building the subsequent phase of the planned satellite communication system.

28 Claims, 4 Drawing Sheets

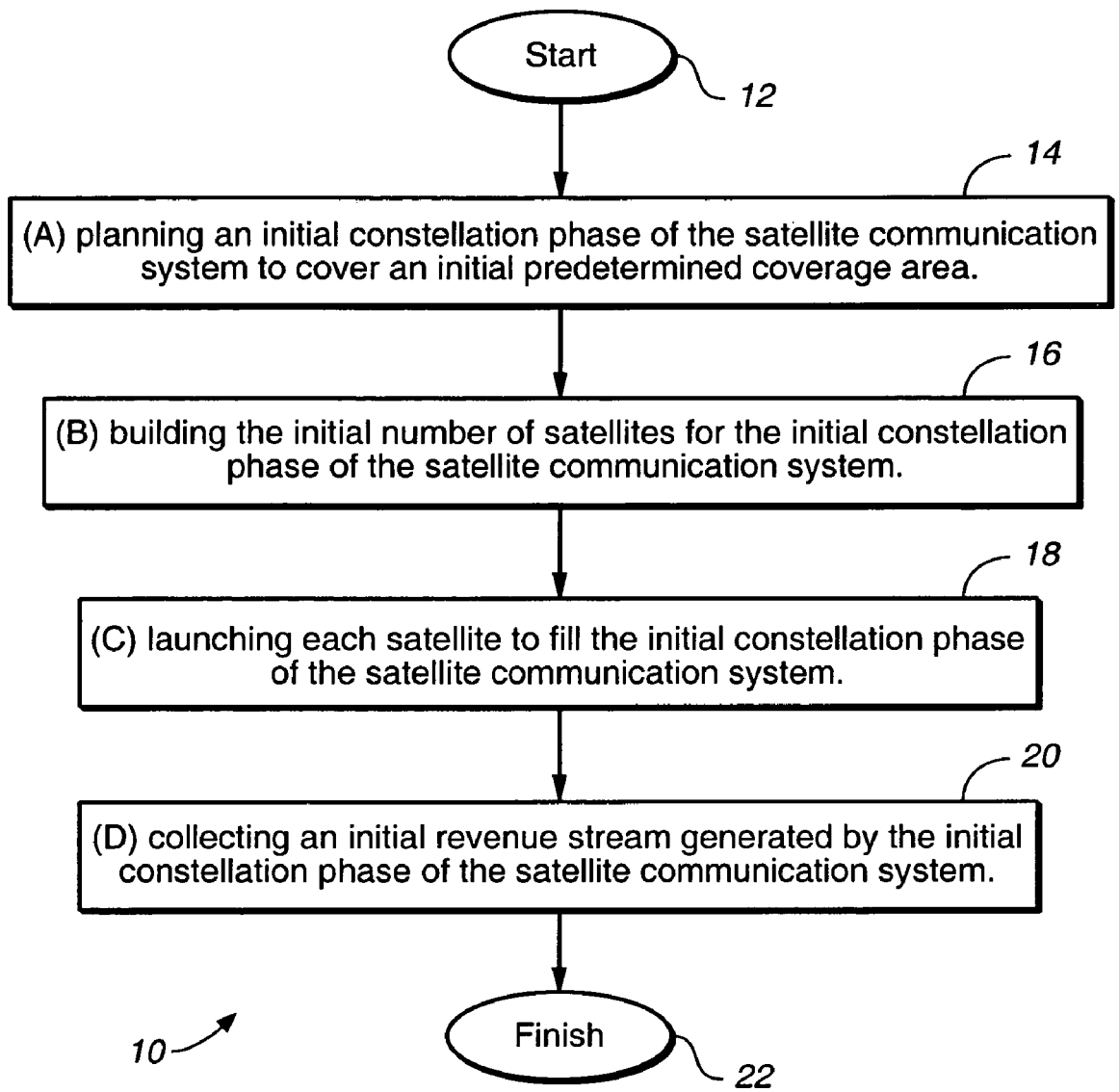
FIG._1

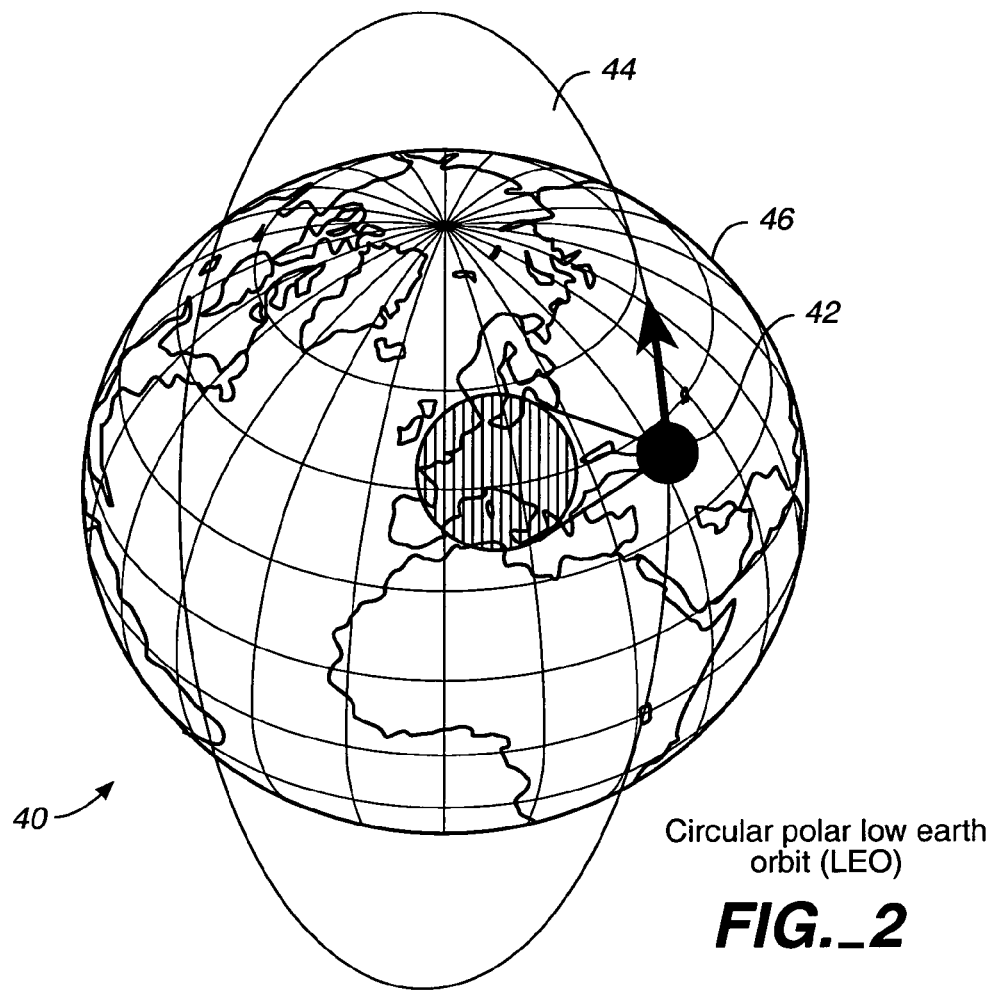
Circular polar low earth orbit (LEO)
FIG._2
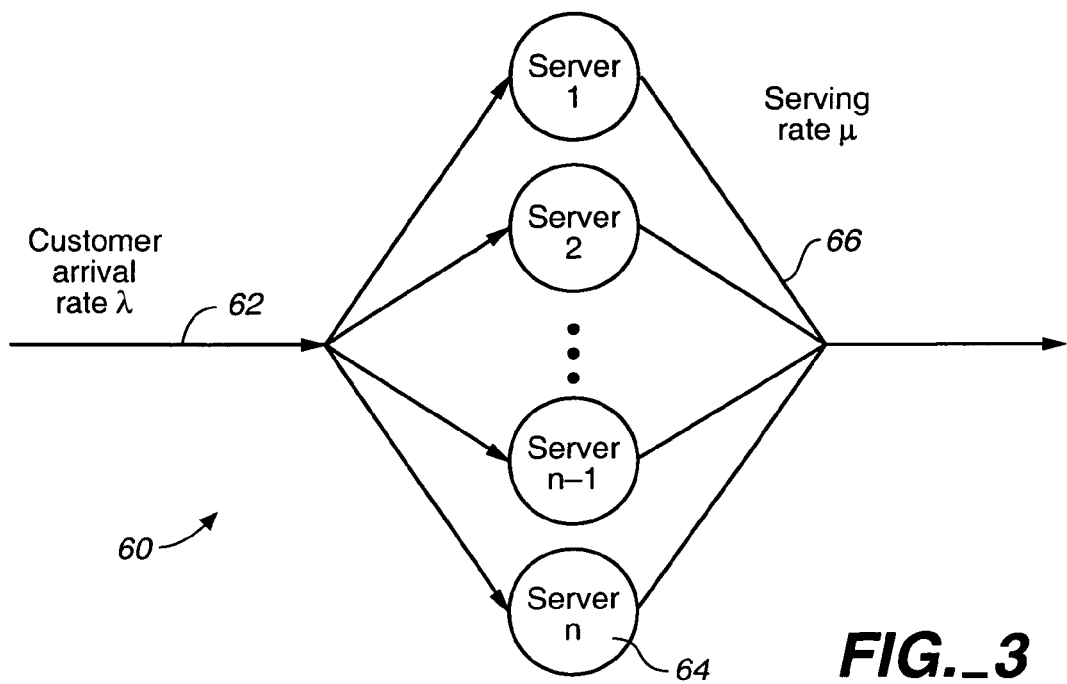
FIG._3

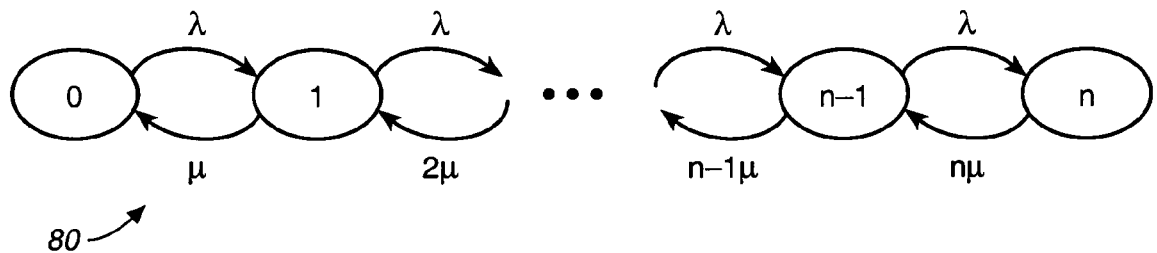
FIG._4
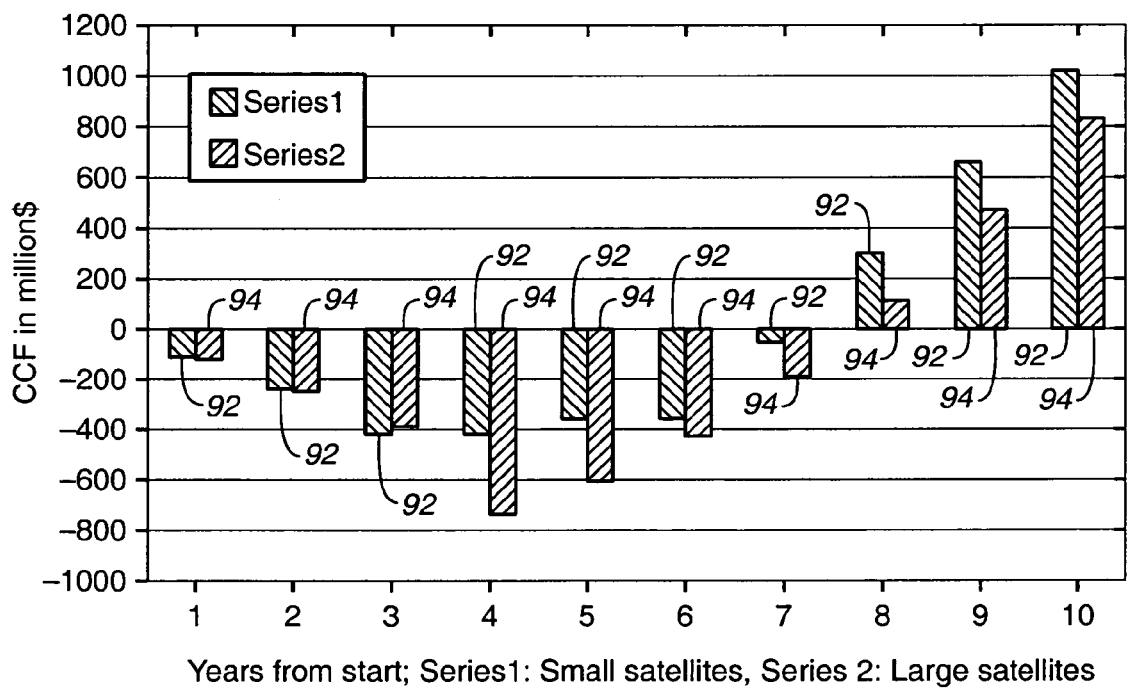
Years from start; Series1: Small satellites, Series 2: Large satellites
FIG._5

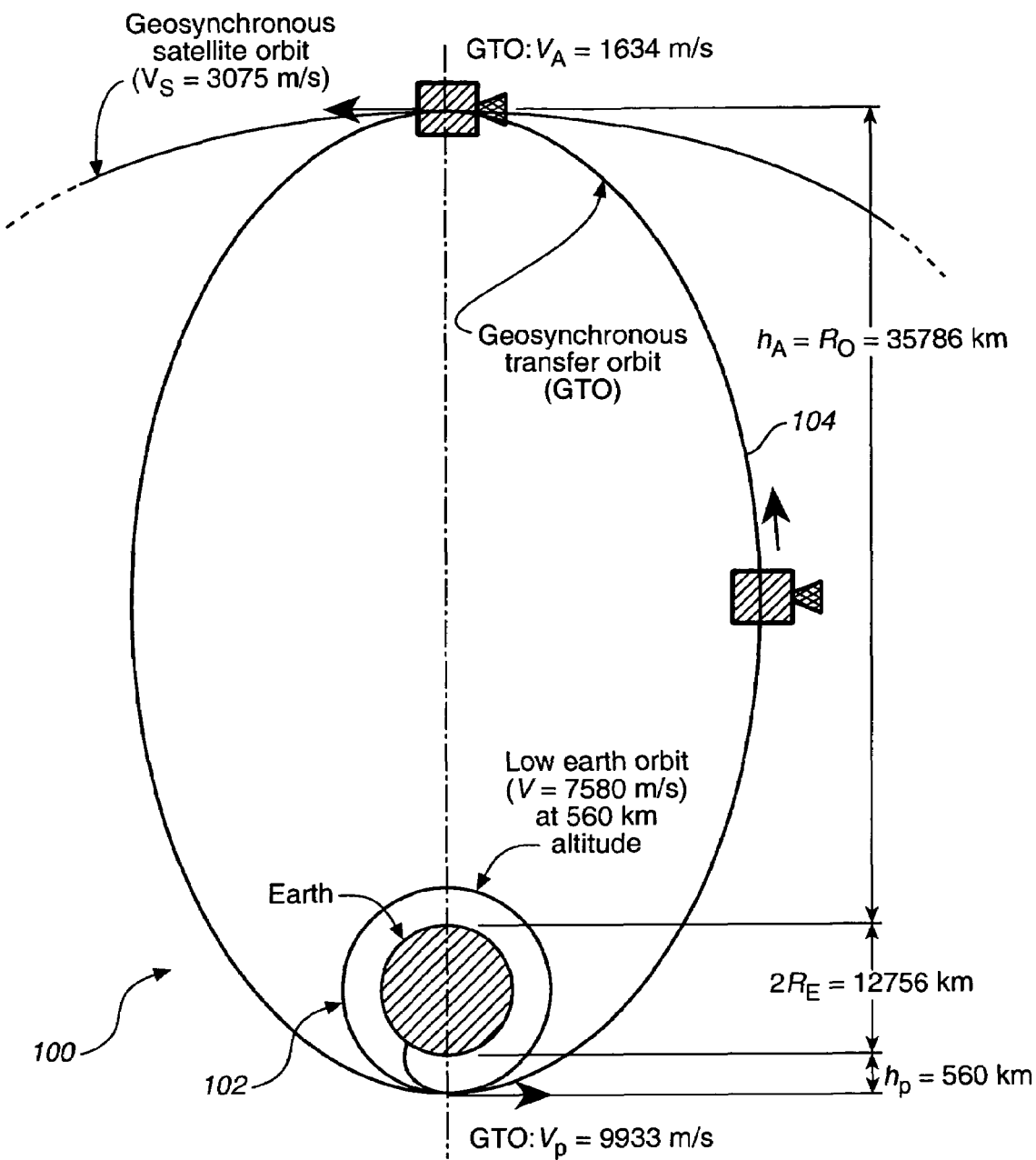
Geosynchronous transfer orbit (GTO) from a low earth orbit to a geosynchronous
FIG._6

US 7,089,013 B2

BUSINESS MODEL OF THE CO-LOCATING SCHEME OF LOW EARTH ORBIT (LEO) AND GEOSTATIONARY (GEO) SATELLITE SYSTEMS

BACKGROUND OF THE INVENTION

1. Field of the Invention

The present invention relates to the field of space applications, and more specifically, to the field of implementing Low Earth Orbit (LEO) satellite systems and Geostationary (GEO) satellite systems for communication purposes.

2. Discussion of the Prior Art

Low Earth Orbit (LEO) communication satellite systems have been traditionally implemented by filling up the entire constellation before enabling its operation for communication purposes. However, there are several drawbacks to this approach. Indeed, it takes time before the satellite system is loaded to its full capacity, and it also takes time to build the subscriber base. During these time periods (which might take several years), the partially built satellite system is not used at all, and the precious space resources are wasted while the partially built satellite system does not produce any revenue stream. Several such prior art satellite systems, for instance, Iridium and Globalstar, eventually went bankrupt, mainly or partially due to this problem of heavy initial investment in space segment before the satellite system could produce its first revenue stream.

SUMMARY OF THE INVENTION

To address the shortcomings of the available art, the present invention provides for the gradually built satellite communication system that can produce the initial revenue stream before it is completed.

One aspect of the present invention is directed to a method of incrementally increasing a revenue stream generated by an incrementally built satellite communication system.

In one embodiment of the present invention, the method comprises the following steps: (A) planning an initial constellation phase of the satellite communication system to cover an initial predetermined coverage area; (B) building the initial number of satellites for the initial constellation phase of the satellite communication system; (C) launching each satellite to fill the initial constellation phase of the satellite communication system; and (D) collecting an initial revenue stream generated by the initial constellation phase of the satellite communication system. The initial constellation phase of the satellite communication system comprises an initial number of satellites and is substantially completed to carry an initial communication traffic for the initial predetermined coverage area.

In one embodiment of the present invention, the initial revenue stream can be used to offset the cost of building of a subsequent constellation phase of the satellite communication system.

In one embodiment of the present invention, the step (A) of planning the initial constellation phase of the satellite communication system further comprises the steps of: (A1) planning an initial number of LEO satellites; and (A2) planning each LEO satellite.

In one embodiment of the present invention, the step (A2) of planning each LEO satellite further comprises the step of (A2, 1) planning each LEO satellite to provide a predetermined percentage point of a full communication traffic capacity of a substantially completed LEO satellite communication system.

In another embodiment of the present invention, the step (A2) of planning each LEO satellite further comprises the step of: (A2, 2) planning each LEO satellite to provide $\alpha$% of the full communication traffic capacity of the substantially completed LEO satellite communication system. In this embodiment, each LEO satellite provides $N_\alpha$ receiving channels and $M_\alpha$ transit channels that operate in $\alpha$% of an allocated frequency band. In this embodiment, the substantially completed LEO satellite communication system while operating in the full communication traffic capacity provides N receiving channels and M transit channels that operate in 100% of the allocated frequency band for a full coverage area.

In one embodiment of the present invention, the step (C) of launching each satellite to fill the initial constellation phase of the satellite communication system further comprises the step of launching the first initial number of small LEO satellites in one launch at a first predetermined launching cost, wherein the satellite communication system comprises a first predetermined number of nodes; and wherein each small LEO is placed in one nod of the satellite communication system. More specifically, in one embodiment of the present invention, the step (C) of launching each satellite to fill the initial constellation phase of the satellite communication system further comprises the step of launching eight small LEO satellites in one Pegasus launch at the first predetermined launching cost. In this embodiment, each small LEO is placed in one nod of the satellite communication system.

In one embodiment of the present invention, the step (C) of launching each satellite to fill the initial constellation phase of the satellite communication system further comprises the step of launching the second initial number of large LEO satellites in one launch at a second predetermined launching cost, wherein the satellite communication system comprises a second predetermined number of nodes, wherein each large LEO is placed in one nod of the satellite communication system. More specifically, in one embodiment of the present invention, the step (C) of launching each satellite to fill the initial constellation phase of the satellite communication system further comprises the step of launching five large LEO satellites in one Pegasus launch at the second predetermined launching cost, wherein each large LEO is placed in one nod of the satellite communication system.

In one embodiment of the present invention, the step (D) of collecting the initial revenue stream generated by the initial constellation phase of the satellite communication system further comprises the steps of: (D1) selecting a percentage point of an initial communication phase traffic intensity for the initial predetermined coverage area covered by the initial constellation phase of the satellite communication system; (D2) calculating an initial maximum number of subscribers in the initial predetermined coverage area covered by the initial constellation phase of the satellite communication system; (D3) selecting a subscription fee per month of coverage; and (D4) calculating the initial revenue stream generated by the initial constellation phase of the satellite communication system.

In one embodiment of the present invention, the step (D1) of selecting the percentage point of the initial communication traffic intensity for the initial predetermined coverage area covered by the initial constellation phase of the satellite communication system further comprises the step (D1, 1) of selecting a $\beta$ percentage point of the initial communication traffic intensity for the initial predetermined coverage area covered by the initial constellation phase of the satellite communication system.

In one embodiment of the present invention, the step (E) of using the initial revenue stream generated by the initial constellation phase of the satellite communication system to build the subsequent constellation phase of the satellite communication system further includes the steps of: (F) planning a second constellation phase of the satellite communication system to cover a second predetermined coverage area; wherein the second constellation phase of the satellite communication system comprises the initial number of satellites and a second number of satellites; and wherein the second constellation phase of the satellite communication system is substantially completed to carry a second phase communication traffic for the second predetermined coverage area; (G) building the second number of satellites for the second constellation phase of the satellite communication system; (H) launching each built in the step (G) satellite to fill the second constellation phase of the satellite communication system; and (I) collecting a second revenue stream generated by the second constellation phase of the satellite communication system.

In one embodiment of the present invention, the second revenue stream is used to offset the cost of building of a subsequent constellation phase of the satellite communication system.

In one embodiment of the present invention, the step (H) of launching each built in the step (G) satellite to fill the second constellation phase of the satellite communication system further comprises the step of launching the second number of small LEO satellites in one launch, wherein each small LEO is placed in one nod of the satellite communication system. In this embodiment of the present invention, each small LEO is co-located with one previously launched LEO satellite that was already placed in one nod in the prior launch.

In another embodiment of the present invention, the step (H) of launching each built in the step (G) satellite to fill the second constellation phase of the satellite communication system further comprises the step of launching the second number of large LEO satellites in one launch, wherein each large LEO is placed in one nod of the satellite communication system. In this embodiment of the present invention, each large LEO is co-located with one previously launched LEO satellite that was already placed in one nod in the prior launch.

In one embodiment of the present invention, the step (I) of collecting the second revenue stream generated by the second constellation phase of the satellite communication system further comprises the step of selecting a percentage point of the second phase communication traffic intensity for the second predetermined coverage area covered by the second constellation phase of the satellite communication system.

Another aspect of the present invention is directed to a method of incrementally increasing a revenue stream generated by an incrementally built Geostationary (GEO) satellite communication system.

In one embodiment of the present invention, the method comprises the following steps: (A) planning an initial constellation phase of the GEO satellite communication system to cover an initial predetermined coverage area; (B) building the first GEO satellite for the initial constellation phase of the GEO satellite communication system; (C) launching the first GEO satellite to fill the initial constellation phase of the GEO satellite communication system; and (D) collecting an initial revenue stream generated by the initial constellation phase of the GEO satellite communication system. In this embodiment of the present invention, the initial constellation phase of the satellite communication system comprises a first GEO satellite configured to carry an initial communication traffic for the initial predetermined coverage area.

In one embodiment of the present invention, the initial revenue stream is used to offset the cost of building of a subsequent constellation phase of the GEO satellite communication system.

In one embodiment of the present invention, the step (A) of planning the initial constellation phase of the GEO satellite communication system further comprises the step (A1) of planning the first GEO satellite to provide a predetermined percentage point of a full communication traffic capacity of a substantially completed GEO satellite communication system. In another embodiment of the present invention, the step (A) of planning the initial constellation phase of the GEO satellite communication system further comprises the step (A2) of planning the first GEO satellite to provide $\alpha\%$ of the full communication traffic capacity of the substantially completed GEO satellite communication system, wherein the first GEO satellite provides $N_\alpha$ receiving channels and $M_\alpha$ transit channels that operate in $\alpha\%$ of an allocated frequency band. In this embodiment of the present invention, the substantially completed GEO satellite communication system while operating in full communication traffic capacity provides N receiving channels and M transit channels that operate in 100% of the allocated frequency band for a full coverage area.

In one embodiment of the present invention, the step (B) of building the first GEO satellite for the initial constellation phase of the GEO satellite communication system further comprises the step of building the first GEO satellite for a first predetermined building cost within a first predetermined building time period.

In one embodiment of the present invention, the step (C) of launching the first GEO satellite to fill the initial constellation phase of the GEO satellite communication system further comprises the step of launching the first GEO satellites in one launch at a first predetermined launching cost. More specifically, in one embodiment of the present invention, the step (C) of launching the first GEO satellite to fill the initial constellation phase of the GEO satellite communication system further comprises the step of launching the first GEO satellite in one Proton launch at the first predetermined launching cost. In this embodiment of the present invention, the GEO satellite communication system comprises a predetermined number of nodes, and the first launched GEO is placed in one nod of the GEO satellite communication system.

In one embodiment of the present invention, the step (D) of collecting the initial revenue stream generated by the initial constellation phase of the GEO satellite communication system further comprises the following steps: (D1) selecting a percentage point of an initial communication phase traffic intensity for the initial predetermined coverage area covered by the initial constellation phase of the GEO satellite communication system; (D2) calculating an initial maximum number of subscribers in the initial predetermined coverage area covered by the initial constellation phase of the GEO satellite communication system; (D3) selecting a subscription fee per month of coverage; and (D4) calculating the initial revenue stream generated by the initial constellation phase of the GEO satellite communication system.

In one embodiment of the present invention, the step (D1) of selecting the percentage point of the initial communication traffic intensity for the initial predetermined coverage area covered by the initial constellation phase of the GEO satellite communication system further comprises the step of selecting a γ percentage point of the initial communication traffic intensity for the initial predetermined coverage area covered by the initial constellation phase of the GEO satellite communication system.

In one embodiment of the present invention, the step (E) of using the initial revenue stream generated by the initial constellation phase of the GEO satellite communication system to build the subsequent constellation phase of the GEO satellite communication system further includes the following steps: (F) planning a second constellation phase of the GEO satellite communication system to cover a second predetermined coverage area; wherein the second constellation phase of the GEO satellite communication system comprises the first GEO satellite and a second GEO satellite; and wherein the second constellation phase of the GEO satellite communication system is substantially completed to carry a second phase communication traffic for the second predetermined coverage area; (G) building the second GEO satellite for the second constellation phase of the GEO satellite communication system; (H) launching the second GEO satellite to fill the second constellation phase of the GEO satellite communication system; and (I) collecting a second revenue stream generated by the second constellation phase of the GEO satellite communication system.

In one embodiment of the present invention, the second revenue stream is used to offset the cost of building of a subsequent constellation phase of the GEO satellite communication system.

One more aspect of the present invention is directed to a data processing system for incrementally increasing a revenue stream generated by an incrementally built satellite communication system, wherein the satellite communication system comprises a plurality of satellites.

In one embodiment of the present invention, the data processing system comprises: (A) a means for planning an initial constellation phase of the satellite communication system, wherein the initial constellation phase of the satellite communication system is configured to cover an initial predetermined coverage area; wherein the initial constellation phase of the satellite communication system comprises an initial number of satellites; and wherein the initial constellation phase of the satellite communication system is substantially completed to carry an initial communication traffic for the initial predetermined coverage area; (B) a means for processing an initial revenue stream generated by the initial constellation phase of the satellite communication system; and (C) a means for planning a subsequent constellation phase of the satellite communication system.

In one embodiment of the present invention, the initial revenue stream is used to offset the cost of building of the subsequent constellation phase of the satellite communication system.

In one embodiment of the present invention, the means (A) for planning the initial constellation phase of the satellite communication system further comprises: (A1) a means for planning satellite configured to provide a predetermined percentage point of a full communication traffic capacity of a substantially completed satellite communication system, wherein the satellite is selected from the group consisting of: {a small LEO satellite; a large LEO satellite; and a GEO satellite}.

In one embodiment of the present invention, the means (A) for planning the initial constellation phase of the satellite communication system further comprises (A2) an artificial intelligence means configured to select the predetermined percentage point of the full communication traffic capacity that is substantially sufficient for the initial coverage of the initial predetermined coverage area.

In one embodiment of the present invention, the means (B) for processing the initial revenue stream generated by the initial constellation phase of the satellite communication system further comprises: (B1) a means for selecting a percentage point of an initial communication phase traffic intensity for the initial predetermined coverage area covered by the initial constellation phase of the satellite communication system; (B2) a means for calculating an initial maximum number of subscribers in the initial predetermined coverage area covered by the initial constellation phase of the satellite communication system; (B3) a means for selecting a subscription fee per month of coverage; and (B4) a means for calculating the initial revenue stream generated by the initial constellation phase of the satellite communication system.

In one embodiment of the present invention, the means (B) for processing the initial revenue stream generated by the initial constellation phase of the satellite communication system further comprises: (B5) an artificial intelligence means configured to select the percentage point of the initial communication phase traffic intensity for the initial predetermined coverage area covered by the initial constellation phase of the satellite communication system; (B6) a computer means configured to calculate the initial maximum number of subscribers in the initial predetermined coverage area covered by the initial constellation phase of the satellite communication system; (B7) an artificial intelligence means configured to select the subscription fee per month of coverage based on a plurality of the coverage area data selected from the group consisting of {an average level of income; an average mobile phone subscription fee; and a number of available mobile phone subscription services}; and (B8) a computer means configured to calculate the initial revenue stream generated by the initial constellation phase of the satellite communication system.

In one embodiment of the present invention, the means (C) for planning the subsequent constellation phase of the satellite communication system further includes: (C1) a means for collecting a subsequent revenue stream generated by the subsequent constellation phase of the satellite communication system.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

FIG. 1 illustrates a flow chart of the method of the present invention of incrementally increasing a revenue stream generated by an incrementally built satellite communication system.

FIG. 2 depicts an orbit of a circular Low Earth Orbit (LEO) satellite having a constant altitude of several hundreds of kilometers and having a period of the order of one and a half hours. With near 90° inclination, this type of orbit guarantees a world wide long term coverage as a result of the combined motion of the LEO satellite itself and rotation of earth.

FIG. 3 is a diagram of a queuing model of an M/M/n/n system.

FIG. 4 illustrates a flow of customers arriving and leaving the M/M/n/n system of FIG. 3 by using a state diagram.

FIG. 5 shows the cumulative cash flow of the method of the present invention of incrementally increasing a revenue stream generated by an incrementally built small LEO and large LEO satellite communication systems.

FIG. 6 depicts the Geostationary (GEO) satellite having a circular orbit with zero inclination (equatorial orbit).

DETAILED DESCRIPTION OF THE PREFERRED AND ALTERNATIVE EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

In general, the present invention shortens the time period between the deployment of the first satellite of the initial constellation phase of the satellite communication system and the time instance when the initial revenue stream generated by the initial constellation phase of satellite communication system becomes available and can be used to deploy the subsequent constellation phase of the satellite communication system.

More specifically, one aspect of the present invention is directed to a method of incrementally increasing a revenue stream generated by an incrementally built satellite communication system.

In one embodiment, as shown in the flow chart 10 of FIG. 1, the method of the present invention comprises the following steps: (step 14-step A) planning an initial constellation phase of the satellite communication system to cover an initial predetermined coverage area; (step 16-step B) building the initial number of satellites for the initial constellation phase of the satellite communication system; (step 18-step C) launching each satellite to fill the initial constellation phase of the satellite communication system; and (step 20-step D) collecting an initial revenue stream generated by the initial constellation phase of the satellite communication system. The initial constellation phase of the satellite communication system comprises an initial number of satellites and is substantially completed to carry an initial communication traffic for the initial predetermined coverage area.

In one embodiment of the present invention, the step (A) (step 14 of FIG. 1) of planning the initial constellation phase of the satellite communication system further comprises the steps of (not shown): (A1) planning an initial number of LEO satellites; and (A2) planning each LEO satellite.

As depicted in FIG. 2, the altitude of a circular Low Earth Orbit (LEO) satellite 42 is constant and equal to several hundreds of kilometers. The period is of the order of one and a half hours. With near 90° inclination, this type of orbit 44 guarantees a world wide long term coverage as a result of the combined motion of the satellite 42 and rotation of earth 46. A constellation of several tens of satellites in low altitude circular orbits can provide worldwide real-time communication. For instance, the prior art (and failed for financial reasons) IRIDIUM project envisioned 66 satellites at 780 km to provide worldwide real-time communication). Nonpolar orbits with less than 90° inclination, can also be used. Indeed, several such satellite communication systems having nonpolar orbits with less than 90° inclination have been proposed (GLOBALSTAR, ECCO, etc.)

As was stated above, the purpose of the present invention is to accelerate the beginning of the revenue stream generated by the satellite communication system. Having this purpose in mind, it is easy to understand that the proper planning of this kind of satellite communication system with accelerated revenue stream is of primary importance. Depending on the final projected capacity and traffic ramp-up time, a basic building block for the space segment is planned to be substantially completed in order to carry a substantial fraction of the full communication traffic that is needed before the second block of satellites is launched. For the purposes of the present invention, the space segment of the satellite communication system should be built-up like a stair case, instead of the prior art approach which was to build the satellite communication system in one big step.

In one embodiment of the present invention, the step (A2) of planning each LEO satellite further comprises the step of planning each LEO satellite to provide a predetermined percentage point of a full communication traffic capacity of a substantially completed LEO satellite communication system.

More specifically, in another embodiment of the present invention, the step (A2) of planning each LEO satellite further comprises the step of planning each LEO satellite to provide $\alpha\%$ of the full communication traffic capacity of the substantially completed LEO satellite communication system. In this embodiment, each LEO satellite provides $N_\alpha$ receiving channels and $M_\alpha$ transit channels that operate in $\alpha\%$ of an allocated frequency band. In this embodiment, the substantially completed LEO satellite communication system while operating in the full communication traffic capacity provides N receiving channels and M transit channels that operate in 100% of the allocated frequency band for a full coverage area.

EXAMPLE I

The Global LEO Satellite Data Communications System Design.

A global LEO satellite data communications system should have N=32 receiving channels and M=4 transmit channels for full operation. Initially, the traffic is low but a linear four year ramp-up to the full operation is forecasted. The building block satellite can be designed to have $\alpha\%$=50% of the full capacity, i.e. $N_\alpha$=16 receiving channels and $M_\alpha$=2 transit channels that operate in 50% of allocated frequency band. After these satellites have been launched and placed in the initial nods of the initial constellation phase of the satellite communication system, the initial revenue stream is enabled.

For the purposes of the present invention, since a building block satellite is intended to carry only a fraction of the full communication traffic, one can use a smaller and lighter weight spacecraft in order to put such building block satellite into orbit. Therefore, the building block satellite cost is low and less expensive to launch, which is typically proportional to the weight. When the system is ready to open for business, the initial space segment investment is smaller than the ones with the full capability. The space segment cost typically is more than 50% of the total system investment. Please, see discussion below.

Referring still to FIG. 1, in one embodiment of the present invention, the step (16) of building each satellite to fill the initial constellation phase of the satellite communication system further comprises the step of initially building eight small LEO satellites at the cost of $40 million in US dollars (the cost of one small LEO satellite is $5 million in US dollars). In another embodiment of the present invention, the step (16) of building each satellite to fill the initial constellation phase of the satellite communication system further comprises the step of initially building five large LEO satellites at the cost of $40 million in US dollars (the cost of one large LEO satellite is $8 million in US dollars).

Referring still to FIG. 1, in one embodiment of the present invention, the step (18) of launching the first initial number of small LEO satellites in one launch at a first predetermined launching cost further includes the step of launching eight small LEO satellites at one Pegasus launch at launching cost of $40 million in US dollars, wherein each small LEO is placed in one nod of the initial phase of the satellite communication system having eight initial nods. Thus, the full cost of the initial constellation phase of the LEO satellite communication system having eight small LEO satellites is $80 million in US dollars.

There are many different techniques to deliver the satellites. One popular way is to put the launch vehicle at low altitude and release one satellite at a time and use the fuel in the satellite to fly to a higher operation orbit. Low orbit has shorter orbital period so it will pass the nodes one at a time.

Referring still to FIG. 1, in another embodiment of the present invention, the step (18) of launching the first initial number of large LEO satellites in one launch at the second predetermined launching cost further includes the step of launching five large LEO satellites at one Pegasus launch at launching cost of $40 million in US dollars. Each large LEO is placed in one nod of the initial phase of the satellite communication system having five initial nods. Thus, the full cost of the initial constellation phase of the LEO satellite communication system having five large LEO satellites is $80 million in US dollars.

The small LEO satellites, being a relatively a cheaper option than a large LEO satellite, offer another advantage: it takes less time (2 years) to build a small LEO satellite than to build a large LEO satellite (3 years), and therefore, the time-to-market is shorter for a small LEO satellite system than that of the large LEO satellite system. Subsequently, the revenue stream can have an early start and the cash flow can be improved. The much needed revenue stream eases further investment demand.

Referring still to FIG. 1, in one embodiment of the present invention, the (step 20-step D) of collecting the initial revenue stream generated by the initial constellation phase of the satellite communication system further comprises the step (D1) of selecting a percentage point of an initial communication phase traffic intensity for the initial predetermined coverage area covered by the initial constellation phase of the satellite communication system. The notion of the traffic intensity can be better understood by using the Erlang-B formula.

An effective communication traffic engineering is a key to an effective satellite communication wireless telephony network design and planning. One way to achieve an effective communication traffic engineering is to determine the dimension of the satellite communication network. The dimensioning of the satellite communication network determines the amount of communication traffic that the satellite communication equipment is capable of capturing. The dimension of the satellite communication network can be determined by using an accurate mathematical traffic model. Indeed, an accurate mathematical traffic model for the satellite communication system greatly enhances the accuracy of network dimensioning, extending network investments and increasing the profit returns. Because the equipment is used more efficiently, it can capture the majority of the traffic and produce greater user satisfaction. On the other hand, a poor modeling of traffic characteristics of the satellite communication system can adversely affect the satellite communication system performance. Indeed, when cells are under-dimensioned, there is insufficient number of radio channels installed, the cell is easily congested, and the overall satellite communication system performance is adversely affected.

Before approaching the problem of network dimensioning, it's essential to understand the Erlang-B formula, which forms the basis of the required mathematical models. Once understood, the Erlang-B formula can be used to model the various real-life scenarios, providing accurate dimensioning of any real satellite communication network.

A communication traffic can be defined in terms of usage of given resources. A traffic on a highway is a good example. Indeed, a highway traffic is the number of cars that use the highway for transportation. The increased traffic on the highway implies that the highway is used by more cars. In a wireless telephony network comprising a plurality of communication satellites, the communication traffic is defined in terms of usage of radio channels.

Revenue from a wireless network is directly proportional to the amount of time that communication channels are being occupied. When a user makes a phone call, a channel is seized for communications, generating traffic. As a result, traffic is proportional to the average call duration.

Thus, the communication traffic is related to the usage of radio channels. One can introduce the notion of "the traffic value" that is directly proportional to the frequency of phone calls and to the average duration of those calls. The traffic (value) per subscriber ($\rho'$), or traffic intensity in a wireless network is defined as in terms of $\lambda'$ (that is the number of calls a user makes in a given period of time), and in terms of $1/\mu$ (which is the average duration of each call). The unit of the traffic intensity ($\rho'$) is the Erlang and it can be interpreted as how long on average a user occupies a radio channel, within a certain amount of time. If a user in a wireless system makes an average of two phone calls an hour, with each call lasting 1.5 min., the traffic per subscriber ($\rho'$), or traffic intensity, would be $\rho'=2/60 \times 1.5 = 50$ mE.

A wireless network can be generally modeled as a queuing system. A queuing system has customers, servers, and waiting rooms. Its characteristics are governed by the arrival behavior and serving behavior. Arrival behavior is the probability distribution of customer arrivals, that is, how often a customer would arrive at the system. Serving behavior is the probability distribution of service. Upon arrival, customers will spend time being served. The distribution of the serving time is the serving behavior. In queuing theory, different models are based on different queuing scenarios. The simplest one takes the form M/M/1/x.

The first "M", which represents the arrival distribution, is memory-less. The arrival of one customer is independent of other customers. This is generally true for any wireless communication system. The second "M", representing the serving distribution, also is memory-less. The serving time of a customer is independent of all other customers. The "1" means there is only one server in a system, while the "x" indicates that there is an infinite number of waiting rooms in the queuing system. The probability of this system having k customers ($P_k$) can be defined in terms of the total arrival rate $\lambda$ and the mean serving time $1/\mu$.

Engineers using this model make four assumptions. Primarily, the population of customers is infinite. That is, there is an unlimited supply of customers. Next, a served customer leaving the system would not immediately return. Third, all customers waiting in the line cannot leave the system. Finally, the system would be first-come, first-served.

A similar model can be applied to wireless telephony systems, including satellite communication systems. Servers are radio traffic channels in each cell. Customers are calls from different mobiles. In queuing theory's terminology, a cell with n radio traffic channels can be described by M/M/n/n. Erlang studied this system and devised some very useful formulas during the 1910s. His research lead to the Erlang-B formula, which is the most widely used formula for traffic engineering.

The queuing model of an M/M/n/n system can be represented by a diagram 60 of FIG. 3. In the diagram 60, $\lambda$ 62 is the total arrival rate, which is different than that defined in traffic intensity. The total arrival rate $\lambda$ 62 can be also defined as the rate at which customers from a group of customers arrive at the system. Meanwhile, n 64 is the number of servers in the system. Each customer will be served at the rate of $\mu$ 66, meaning each customer will finish service in $1/\mu$ unit of time. Distributions of customer arrivals and service times are assumed to be memory-less. There is no waiting room at the system. When all n servers are busy, customers are lost. When a customer has finished service, it leaves the system forever and doesn't return to the system for additional service.

Customers arriving and leaving the M/M/n/n system can be described by a state diagram 80 of FIG. 4. There are (n+1) possible states that represent the number of customers in the system. The rate of the system changing from state i to i+1 for i=0, 1, . . . , n−1 is $\lambda$, i.e., when a new customer comes to the system and finds an available server.

The rate of the system changing from j to j−1 for j=1, . . . , n is $j\mu$, meaning a customer has finished service and leaves the system. State j changes to state j−1, related to j. When j customers are being served in the system, the probability of a customer leaving a system would be j times higher because any one of the j customers finishing service would change the state of the system. The flow between states in a stable system would be equal. Otherwise, the system would either be congested all the time or empty all the time. With this equilibrium property one can define the probabilities of the system having i customers $\lambda P_i = (i+1)\mu P_{i+1}$, for i=0, 1, . . . , n−1; where $P_i$ for i=0, 1, . . . n are. Additionally, the property of sum of all possible states' probabilities is equal 1. The probability of k customers in the system can be obtained from by using $\rho$ which is defined as the offered traffic or offered load. Since $\lambda$ is the total arrival rate, $\rho$ is the total offered load from the customers.

As the probabilities for a system having k customers for k=0, 1, . . . , n are obtained, the issue is when the congestion starts? The answer is—when all n servers are busy, a new customer coming to the system is blocked. That's $P_n$. As a result:

$$P_{BLOCKING} = \frac{\rho^n/n!}{\sum_{i=o}^{n} \rho^i/i!} \quad \text{(Eq. 1)}$$

where $\rho = \lambda/\mu$. This is known as the Erlang-B formula. It's critical because it governs the relationship among blocking probability ($P_{BLOCKING}$), offered traffic ($\rho$), and the number of traffic channels (n). Given any two of the values, the remaining variable can be determined.

The traffic in a wireless telephony network can be modeled by the M/M/n/n model, whereas n is the number of traffic channels in a sector. Therefore, in a wireless satellite communication telephony network, the Erlang-B formula given by (Eq. 1) can be used to determine how many channels are required to capture the traffic. Indeed, given the quality of service (QoS), which is equivalent to the blocking probability (QoS=$P_{BLOCKING}$), and the number of radio channels in a cell (n), one can obtain the offered traffic by using (Eq. 1). Furthermore, the actual captured traffic ($\hat{\rho}$) can be calculated as follows:

$$\hat{\rho} = \rho(1 - P_{BLOCKING}); \quad \text{(Eq. 2)}$$

The four values—QoS, number of radio channels (n), offered traffic ($\rho$), and captured traffic ($\hat{\rho}$)—are all governed by (Eq. 1) and (Eq. 2). All of the traffic characteristics can be obtained using these two equations. Whenever two of the four values are defined, the other two can be calculated accordingly. Finally, one can relate the offered traffic to the total number of subscribers in a cell as follows:

Total number of subscribers=(offered traffic/traffic per subscriber)=($\rho/\rho'$) (Eq. 3)

The (Eq. 3) is derived simply by using the direct proportionality property of the offered load to the number of users accommodated in a cell.

Referring still to FIG. 1, in one embodiment of the present invention, the (step 20-step D) of collecting the initial revenue stream generated by the initial constellation phase of the satellite communication system further comprises the following steps: (D1) selecting a percentage point of an initial communication phase traffic intensity for the initial predetermined coverage area covered by the initial constellation phase of the satellite communication system; (D2) calculating an initial maximum number of subscribers in the initial predetermined coverage area covered by the initial constellation phase of the satellite communication system; (D3) selecting a subscription fee per month of coverage; and (D4) calculating the initial revenue stream generated by the initial constellation phase of the satellite communication system.

EXAMPLE II

The initial revenue stream generated by the initial constellation phase of the satellite communication system comprising 8 small LEO satellites.

The traffic intensity is assumed to be 0.001. Since 32 receive channels are available for each satellite and the total number of small LEO satellites launched in the first Pegasus launch is 8, it gives total 256 channels for the initial phase of the satellite communication system comprising 8 small LEO satellites. The maximum number of subscribers is 256,000. The space segment revenue stream is assumed to be $20 per subscriber per month. The full system revenue stream is therefore, about $5,12 million per month, or $61,44 million per year. Thus, the initial revenue stream of $61,44 million per year is generated by investing only $80 million US dollars in the launch of 8 small LEO satellites.

In one embodiment of the present invention, the initial revenue stream can be used to offset the cost of building of a subsequent constellation phase of the satellite communication system by using the following steps (not shown): (F) planning a second constellation phase of the satellite communication system to cover a second predetermined coverage area; wherein the second constellation phase of the satellite communication system comprises the initial number of satellites and a second number of satellites; and wherein the second constellation phase of the satellite communication system is substantially completed to carry a second phase communication traffic for the second predetermined coverage area; (G) building the second number of satellites for the second constellation phase of the satellite communication system; (H) launching each built in the step (G) satellite to fill the second constellation phase of the satellite communication system; and (I) collecting a second revenue stream generated by the second constellation phase of the satellite communication system.

Similarly, in one embodiment of the present invention, the second revenue stream is used to offset the cost of building of a subsequent constellation phase of the satellite communication system.

In one embodiment of the present invention, the step (H) of launching each built in the step (G) satellite to fill the second constellation phase of the satellite communication system further comprises the step of launching the second number of small LEO satellites in one launch, wherein each small LEO is placed in one nod of the satellite communication system. In this embodiment of the present invention, each small LEO is co-located with one previously launched LEO satellite that was already placed in one nod in the prior launch.

Indeed, one method of gradual increase of the space segment capacity is a method of co-locating the LEO satellites. More specifically, for each satellite location nod, two LEO satellites can be flown at about 10 km apart so that the collision probability is low enough to be acceptable. The angular separation of these two LEO satellites is less than three degrees and as far as the user is concern, there is only one space node since the user system operates with broad hemispheric beams.

The first LEO satellite can be launched into the allocated nod and the consequent satellites that are portions of possibly the Frequency Division Multiple Access scheme can be put into the same nod with sufficient distance between them to minimize the possibility of collision.

In another embodiment of the present invention, the step (H) of launching each built in the step (G) satellite to fill the second constellation phase of the satellite communication system further comprises the step of launching the second number of large LEO satellites in one launch, wherein each large LEO is placed in one nod of the satellite communication system. In this embodiment of the present invention, each large LEO is co-located with one previously launched LEO satellite that was already placed in one nod in the prior launch.

EXAMPLE III

As was stated above, the global LEO satellite data communications system should have 32 receiving channels and 4 transmit channels for full operation. The following assumptions are made for the financial analysis: (A) the cost for each small satellite is $5 million and takes 2 years to build; eight satellites can be launched by one Pegasus launch, which costs $40 million; (B) the cost for each of the large satellite is $8 million and it takes 3 years to build; five large satellites can be launched by one Pegasus launch that costs $40 million; (C) traffic will take 6 years to ramp up linearly to the full capacity; (D) since 32 receive channels are available for each satellite and the total number of satellites is 48, that will give a total 1,536 channels for the full system; (E) assuming traffic intensity of 0.001, the maximum number of subscribers is 1,536,000; (F) space segment revenue is based on subscription fee of $20 per subscriber per month; (G) the full system revenue stream is therefore, about $30 million per month, or $360 million per year; (H) 2003 constant dollar is assumed; the cost of obtaining investment is not included, though it would actually enlarge the differences if included.

The charts of FIG. 5 show the cumulative cash flow of the present business model for small LEO satellites (charts 92) and for large LEO satellites (charts 94). It can be seen that the most prominent feature of these charts is that the maximum investment for the small LEO satellite approach would require about $400 million whereas the large LEO satellite approach would require $730 million investment for the space segment, almost doubled. Due to the conservative assumption of the revenue generation, the system turns black after about 7 years from the start. The cash flow situation for the small LEO satellite approach is always better than that of the large LEO satellite case.

Another aspect of the present invention is directed to a method of incrementally increasing a revenue stream generated by an incrementally built Geostationary (GEO) satellite communication system.

Contrary to widespread opinion, the altitude of the satellite is not a determining factor in the link budget for a given earth coverage. Indeed, the propagation attenuation varies as the inverse square of the distance and this favors a satellite following a low orbit on account of its low altitude. However, this disregards the fact that the area to be covered is then seen through a larger solid angle. The result is a reduction in the gain of the satellite antenna which offsets the distance advantage. However, a satellite following a low orbit provides only limited earth coverage at a given time and limited time at a given location. Unless low gain antennas (of the order of a few dB) which provide low directivity and hence almost omnidirectional radiation are installed, earth stations should be equipped with satellite tracking devices which increase the cost.

As depicted in FIG. 6, the Geostationary (GEO) satellites have circular orbits 102 with zero inclination (equatorial orbits). The GEO satellite orbits the earth in the equatorial plane according to the earth rotation at an altitude of 35786 km. The period is equal to that of the rotation of the earth. The satellite thus appears as a point fixed in the sky and ensures continuous operation as a radio relay in real time for the area of visibility of the satellite (43% of the earth's surface). The GEO satellite appears to be particular useful for continuous coverage of extensive regions. However, it does not permit coverage of the polar regions which are accessible by satellites in inclined elliptical orbits, like a LEO satellite, or a specifically polar orbit satellite.

The advantages of LEO satellites and the increasing congestion of GEO satellite orbits suggest the future development of orbiting satellites. The disadvantages of a orbiting satellite (limited duration of communication time and relatively small coverage) can be reduced in a network containing a large number of satellites which are interconnected by intersatellite links and equipped with a means of switching between beams. Installation into orbit consists of positioning the satellite in its nominal orbit from a launching site on the surface of the earth. A launch vehicle which may have various associate auxiliary propulsion systems is used to inject the satellite into an intermediate orbit called the transfer orbit 104 of FIG. 6. The procedure using a transfer orbit is based on the so-called Hohmann transfer which enables the satellite to move from a low altitude circular orbit into a higher altitude circular orbit with a minimum expenditure of energy. The first velocity increment changes the low altitude circular into the transfer orbit which is an elliptical one whose perigee altitude is that of the circular orbit, and the altitude of the apogee depends on the magnitude of the applied velocity increment. A second velocity increment at the apogee of the transfer orbit enables a circular orbit to be obtained at the altitude of the apogee.

Referring still to FIG. 1, in one embodiment of the present invention, the method comprises the following steps: (step 14-step A) planning an initial constellation phase of the GEO satellite communication system to cover an initial predetermined coverage area; (ste 16-step B) building the first GEO satellite for the initial constellation phase of the GEO satellite communication system; (step 18-step C) launching the first GEO satellite to fill the initial constellation phase of the GEO satellite communication system; and (step 20-step D) collecting an initial revenue stream generated by the initial constellation phase of the GEO satellite communication system. In this embodiment of the present invention, the initial constellation phase of the satellite communication system comprises a first GEO satellite configured to carry an initial communication traffic for an initial predetermined coverage area.

In one embodiment of the present invention, an initial predetermined coverage area which comprises only areas with high business density and/or high population density.

EXAMPLE IV

A single GEO launch depends on the weight of the payload. For the case design, we do not separate the costs. We assume the on orbit cost of the small GEO satellite is $70 million and the large GEO satellite is $200 million. These costs include both the GEO satellite cost and the launch cost using a single Proton launch. Business model concentrates in high population area density and high per capita income area to start with. As the business grows, we can add more beams to the coverage area. For example, the first GEO can be launched at the stationary orbit at Pacific Ocean so that its beam can cover Alaska, whereas the network of 8 GEO satellites can cover the following US states with high business density and/or high population density: Alaska, Hawaii, Oregon, Washington, Arizona, North California, South California, Louisiana.

For the given above example of the GEO communication satellites deployment strategy of the present invention, the initial investment is kept at the level of $200 million. However, the initial deployment strategy of the present invention can be adjusted in accordance to market shift. On the other hand, the prior art deployment strategy of the communication satellites requires the huge initial investment at the level of 500 million, and it is not adjustable depending on market forces.

In one embodiment of the present invention, the initial revenue stream is used to offset the cost of building of a subsequent constellation phase of the GEO satellite communication system.

One more aspect of the present invention is directed to a data processing system for incrementally increasing a revenue stream generated by an incrementally built satellite communication system, wherein the satellite communication system comprises a plurality of satellites.

In one embodiment of the present invention, the data processing system comprises (not shown): (A) a means for planning an initial constellation phase of the satellite communication system, wherein the initial constellation phase of the satellite communication system is configured to cover an initial predetermined coverage area; wherein the initial constellation phase of the satellite communication system comprises an initial number of satellites; and wherein the initial constellation phase of the satellite communication system is substantially completed to carry an initial communication traffic for the initial predetermined coverage area; (B) a means for processing an initial revenue stream generated by the initial constellation phase of the satellite communication system; and (C) a means for planning a subsequent constellation phase of the satellite communication system.

In one embodiment of the present invention, the initial revenue stream is used to offset the cost of building of the subsequent constellation phase of the satellite communication system.

In one embodiment of the present invention, the means (A) for planning the initial constellation phase of the satellite communication system further comprises: (A1) a means for planning satellite configured to provide a predetermined percentage point of a full communication traffic capacity of a substantially completed satellite communication system, wherein the satellite is selected from the group consisting of: {a small LEO satellite; a large LEO satellite; and a GEO satellite}.

In one embodiment of the present invention, the means (A) for planning the initial constellation phase of the satellite communication system further comprises (A2) an artificial intelligence means configured to select the predetermined percentage point of the full communication traffic capacity that is substantially sufficient for the initial coverage of the initial predetermined coverage area.

In one embodiment of the present invention, the means (B) for processing the initial revenue stream generated by the initial constellation phase of the satellite communication system further comprises: (B1) a means for selecting a percentage point of an initial communication phase traffic intensity for the initial predetermined coverage area covered by the initial constellation phase of the satellite communication system; (B2) a means for calculating an initial maximum number of subscribers in the initial predetermined coverage area covered by the initial constellation phase of the satellite communication system; (B3) a means for selecting a subscription fee per month of coverage; and (B4) a means for calculating the initial revenue stream generated by the initial constellation phase of the satellite communication system.

In one embodiment of the present invention, the means (B) for processing the initial revenue stream generated by the initial constellation phase of the satellite communication system further comprises: (B5) an artificial intelligence means configured to select the percentage point of the initial communication phase traffic intensity for the initial predetermined coverage area covered by the initial constellation phase of the satellite communication system; (B6) a computer means configured to calculate the initial maximum number of subscribers in the initial predetermined coverage area covered by the initial constellation phase of the satellite communication system; (B7) an artificial intelligence means configured to select the subscription fee per month of coverage based on a plurality of the coverage area data selected from the group consisting of {an average level of income; an average mobile phone subscription fee; and a number of available mobile phone subscription services}; and (B8) a computer means configured to calculate the initial revenue stream generated by the initial constellation phase of the satellite communication system.

In one embodiment of the present invention, the means (C) for planning the subsequent constellation phase of the satellite communication system further includes: (C1) a means for collecting a subsequent revenue stream generated by the subsequent constellation phase of the satellite communication system.

It is well know to a person skillful in the art that the data processing system of the present invention for incrementally increasing a revenue stream generated by an incrementally built satellite communication system can be implemented by using a computer program and a processor with sufficient memory.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. Therefore, it is intended that the scope of the invention be defined by the claims appended hereto and their equivalents, rather than by the foregoing description. All changes which come within the meaning and range of equivalency of the claims are to be embraced within their scope.

What is claimed is:

1. A method of incrementally increasing a revenue stream generated by an incrementally built satellite communication system, said satellite communication system comprising a plurality of satellites, said method comprising the steps of:
   (A1) planning an initial number of Low Earth Orbit (LEO) satellites;
   (A2) planning each said LEO satellite; wherein said step (A2) of planning each said LEO satellite further comprises the step of:
   (A2, 1) planning each said LEO satellite to provide a predetermined percentage point of a full communication traffic capacity of a substantially completed LEO satellite communication system;
   (B) building said initial number of satellites for said initial constellation phase of said satellite communication system;
   (C) launching each said satellite to fill said initial constellation phase of said satellite communication system; and
   (D) collecting an initial revenue stream generated by said initial constellation phase of said satellite communication system;
   wherein said initial constellation phase of said satellite communication system comprises an initial number of satellites; and wherein said initial constellation phase of said satellite communication system is substantially completed to carry an initial communication traffic for said initial predetermined coverage area.

2. A method of incrementally increasing a revenue stream generated by an incrementally built satellite communication system, said satellite communication system comprising a plurality of satellites, said method comprising the steps of:
   (A1) planning an initial number of Low Earth Orbit (LEO) satellites; wherein an initial constellation phase of said satellite communication system comprises said initial number of LEO satellites; and wherein said initial constellation phase of said satellite communication system is substantially completed to carry an initial communication traffic for an initial predetermined coverage area;
   (A2) planning each said LEO satellite; wherein said step (A2) of planning each said LEO satellite further comprises the step of:
   (A2, 2) planning each said LEO satellite to provide a $\alpha\%$ of said full communication traffic capacity of said substantially completed LEO satellite communication system, wherein each said LEO satellite provides $N_\alpha$ receiving channels and $M_\alpha$ transit channels that operate in $\alpha\%$ of an allocated frequency band, and wherein said substantially completed LEO satellite communication system while operating in said full communication traffic capacity provides N receiving channels and M transit channels that operate in 100% of said allocated frequency band for a full coverage area;
   (B) building said initial number of satellites for said initial constellation phase of said satellite communication system;
   (C) launching each said satellite to fill said initial constellation phase of said satellite communication system; and
   (D) collecting an initial revenue stream generated by said initial constellation phase of said satellite communication system.

3. A method of incrementally increasing a revenue stream generated by an incrementally built satellite communication system, said satellite communication system comprising a plurality of satellites, said method comprising the steps of:
   (A) planning an initial constellation phase of said satellite communication system to cover an initial predetermined coverage area; wherein said initial constellation phase of said satellite communication system comprises an initial number of satellites; and wherein said initial constellation phase of said satellite communication system is substantially completed to carry an initial communication traffic for said initial predetermined coverage area;
   (B1) building a first initial number of small LEO satellites for a first predetermined building cost within a first predetermined building time period;
   (C) launching each said small LEO satellite to fill said initial constellation phase of said satellite communication system; and
   (D) collecting an initial revenue stream generated by said initial constellation phase of said satellite communication system.

4. A method of incrementally increasing a revenue stream generated by an incrementally built satellite communication system, said satellite communication system comprising a plurality of satellites, said method comprising the steps of:
   (A) planning an initial constellation phase of said satellite communication system to cover an initial predetermined coverage area; wherein said initial constellation phase of said satellite communication system comprises an initial number of satellites; and wherein said initial constellation phase of said satellite communication system is substantially completed to carry an initial communication traffic for said initial predetermined coverage area;

(B2) building a second initial number of large LEO satellites for a second predetermined building cost within a second predetermined building time period;

(C) launching each said large LEO satellite to fill said initial constellation phase of said satellite communication system; and (D) collecting an initial revenue stream generated by said initial constellation phase of said satellite communication system.

5. A method of incrementally increasing a revenue stream generated by an incrementally built satellite communication system, said satellite communication system comprising a plurality of satellites, said method comprising the steps of:

(A) planning an initial constellation phase of said satellite communication system to cover an initial predetermined coverage area; wherein said initial constellation phase of said satellite communication system comprises an initial number of satellites; and wherein said initial constellation phase of said satellite communication system is substantially completed to carry an initial communication traffic for said initial predetermined coverage area;

(B) building a first initial number of small LEO satellites for said initial constellation phase of said satellite communication system;

(C1) launching said first initial number of said small LEO satellites in one launch at a first predetermined launching cost, wherein said satellite communication system comprises a first predetermined number of nodes; and wherein each said small LEO is placed in one said nod of said satellite communication system; and (D) collecting an initial revenue stream generated by said initial constellation phase of said satellite communication system.

6. The method of claim 5, wherein said step (C1) of launching said first initial number of said small LEO satellites in one launch at said first predetermined launching cost further comprises the step of:

(C1, 1) launching eight said small LEO satellites in one Pegasus launch at said first predetermined launching cost; and wherein each said small LEO is placed in one said nod of said satellite communication system.

7. A method of incrementally increasing a revenue stream generated by an incrementally built satellite communication system, said satellite communication system comprising a plurality of satellites, said method comprising the steps of:

(A) planning an initial constellation phase of said satellite communication system to cover an initial predetermined coverage area; wherein said initial constellation phase of said satellite communication system comprises an initial number of satellites; and wherein said initial constellation phase of said satellite communication system is substantially completed to carry an initial communication traffic for said initial predetermined coverage area;

(B) building a second initial number of large LEO satellites for said initial constellation phase of said satellite communication system;

(C3) launching said second initial number of said large LEO satellites in one launch at a second predetermined launching cost, wherein said satellite communication system comprises a second predetermined number of nodes; and wherein each said large LEO is placed in one said nod of said satellite communication system; and (D) collecting an initial revenue stream generated by said initial constellation phase of said satellite communication system.

8. The method of claim 7, wherein said step (C3) of launching said second initial number of said large LEO satellites in one launch at said second predetermined launching cost further comprises the step of:

(C3, 1) launching five said large LEO satellites in one Pegasus launch at said second predetermined launching cost; and wherein each said large LEO is placed in one said nod of said satellite communication system.

9. A method of incrementally increasing a revenue stream generated by an incrementally built satellite communication system, said satellite communication system comprising a plurality of satellites, said method comprising the steps of:

(A) planning an initial constellation phase of said satellite communication system to cover an initial predetermined coverage area; wherein said initial constellation phase of said satellite communication system comprises an initial number of satellites; and wherein said initial constellation phase of said satellite communication system is substantially completed to carry an initial communication traffic for said initial predetermined coverage area;

(B) building said initial number of satellites for said initial constellation phase of said satellite communication system;

(C) launching each said satellite to fill said initial constellation phase of said satellite communication system;

(D1) selecting a percentage point of an initial communication phase traffic intensity for said initial predetermined coverage area covered by said initial constellation phase of said satellite communication system;

(D2) calculating an initial maximum number of subscribers in said initial predetermined coverage area covered by said initial constellation phase of said satellite communication system;

(D3) selecting a subscription fee per month of coverage; and (D4) calculating an initial revenue stream generated by said initial constellation phase of said satellite communication system.

10. The method of claim 9, wherein said step (D1) of selecting said percentage point of said initial communication traffic intensity for said initial predetermined coverage area covered by said initial constellation phase of said satellite communication system further comprises the step of:

(D1, 1) selecting a $\beta$ percentage point of said initial communication traffic intensity for said initial predetermined coverage area covered by said initial constellation phase of said satellite communication system.

11. A method of incrementally increasing a revenue stream generated by an incrementally built satellite communication system, said satellite communication system comprising a plurality of satellites, said method comprising the steps of:

(A) planning an initial constellation phase of said satellite communication system to cover an initial predetermined coverage area; wherein said initial constellation phase of said satellite communication system comprises an initial number of satellites; and wherein said initial constellation phase of said satellite communication system is substantially completed to carry an initial communication traffic for said initial predetermined coverage area;

(B) building said initial number of satellites for said initial constellation phase of said satellite communication system;

(C) launching each said satellite to fill said initial constellation phase of said satellite communication system;

(D) collecting an initial revenue stream generated by said initial constellation phase of said satellite communication system;

(F) planning a second constellation phase of said satellite communication system to cover a second predetermined coverage area; wherein said second constellation phase of said satellite communication system comprises said initial number of satellites and a second number of satellites; and wherein said second constellation phase of said satellite communication system is substantially completed to carry a second phase communication traffic for said second predetermined coverage area;

(G) building said second number of satellites for said second constellation phase of said satellite communication system;

(H) launching each said built in said step (G) satellite to fill said second constellation phase of said satellite communication system; and (I) collecting a second revenue stream generated by said second constellation phase of said satellite communication system; wherein said second revenue stream is used to offset the cost of building of a subsequent constellation phase of said satellite communication system.

12. The method of claim 11, wherein said step (H) of launching each said built in said step (G) satellite to fill said second constellation phase of said satellite communication system further comprises the step of:

(H1) launching said second number of said small LEO satellites in one launch, and wherein each said small LEO is placed in one said nod of said satellite communication system.

13. The method of claim 11, wherein said step (H) of launching each said built in said step (G) satellite to fill said second constellation phase of said satellite communication system further comprises the steps of:

(H2) launching said second number of said small LEO satellites in one said launch; and (H3) co-locating each said small LEO with one said previously launched LEO satellite that was already placed in one said nod in one said prior launch.

14. The method of claim 11, wherein said step (H) of launching each said built in said step (G) satellite to fill said second constellation phase of said satellite communication system further comprises the step of:

(H4) launching said second number of said large LEO satellites in one launch, and wherein each said large LEO is placed in one said nod of said satellite communication system.

15. The method of claim 11, wherein said step (H) of launching each said built in said step (G) satellite to fill said second constellation phase of said satellite communication system further comprises the steps of:

(H5) launching said second number of said large LEO satellites in one said launch; and (H6) co-locating each said large LEO with one said previously launched LEO satellite that was already placed in one said nod in one said prior launch.

16. The method of claim 11, wherein said step (I) of collecting said second revenue stream generated by said second constellation phase of said satellite communication system further comprises the step of:

(I1) selecting a percentage point of said second phase communication traffic intensity for said second predetermined coverage area covered by said second constellation phase of said satellite communication system.

17. A method of incrementally increasing a revenue stream generated by an incrementally built satellite communication system, said satellite communication system comprising a plurality of Geostationary (GEO) satellites, said method comprising the steps of:

(A1) planning said first GEO satellite to provide a predetermined percentage point of a full communication traffic capacity of a substantially completed GEO satellite communication system;

(B) building said first GEO satellite for said initial constellation phase of said GEO satellite communication system;

(C) launching said first GEO satellite to fill said initial constellation phase of said GEO satellite communication system; and (D) collecting an initial revenue stream generated by said initial constellation phase of said GEO satellite communication system.

18. A method of incrementally increasing a revenue stream generated by an incrementally built satellite communication system, said satellite communication system comprising a plurality of Geostationary (GEO) satellites, said method comprising the steps of:

(A2) planning said first GEO satellite to provide $\alpha\%$ of a full communication traffic capacity of a substantially completed GEO satellite communication system, wherein said first GEO satellite provides $N_\alpha$ receiving channels and $M_\alpha$ transit channels that operate in $\alpha\%$ of an allocated frequency band, and wherein said substantially completed GEO satellite communication system while operating in said full communication traffic capacity provides N receiving channels and M transit channels that operate in 100% of said allocated frequency band for a full coverage area;

(B) building said first GEO satellite for said initial constellation phase of said GEO satellite communication system;

(C) launching said first GEO satellite to fill said initial constellation phase of said GEO satellite communication system; and (D) collecting an initial revenue stream generated by said initial constellation phase of said GEO satellite communication system.

19. A method of incrementally increasing a revenue stream generated by an incrementally built satellite communication system, said satellite communication system comprising a plurality of Geostationary (GEO) satellites, said method comprising the steps of:

(A) planning an initial constellation phase of said GEO satellite communication system to cover an initial predetermined coverage area; wherein said initial constellation phase of said satellite communication system comprises a first GEO satellite; and wherein said first GEO satellite is configured to carry an initial communication traffic for said initial predetermined coverage area;

(B1) building said first GEO satellite for a first predetermined building cost within a first predetermined building time period;

(C) launching said first GEO satellite to fill said initial constellation phase of said GEO satellite communication system; and (D) collecting an initial revenue stream generated by said initial constellation phase of said GEO satellite communication system.

20. A method of incrementally increasing a revenue stream generated by an incrementally built satellite communication system, said satellite communication system comprising a plurality of Geostationary (GEO) satellites, said method comprising the steps of:

(A) planning an initial constellation phase of said GEO satellite communication system to cover an initial predetermined coverage area; wherein said initial constellation phase of said satellite communication system comprises a first GEO satellite; and wherein said first GEO satellite is configured to carry an initial communication traffic for said initial predetermined coverage area;

(B) building said first GEO satellite for said initial constellation phase of said GEO satellite communication system;

(C1) launching said first GEO satellites in one launch at a first predetermined launching cost, wherein said GEO satellite communication system comprises a predetermined number of nodes; and wherein said GEO is placed in one said nod of said GEO satellite communication system; and (D) collecting an initial revenue stream generated by said initial constellation phase of said GEO satellite communication system.

21. The method of claim 20, wherein said step (C1) of launching said first GEO satellites in one launch at a first predetermined launching cost, wherein said GEO satellite communication system comprises a predetermined number of nodes; and wherein said GEO is placed in one said nod of said GEO satellite communication system further comprises the step of:

(C1, 1) launching said first GEO satellite in one Proton launch at said first predetermined launching cost.

22. A method of incrementally increasing a revenue stream generated by an incrementally built satellite communication system, said satellite communication system comprising a plurality of Geostationary (GEO) satellites, said method comprising the steps of:

(A) planning an initial constellation phase of said GEO satellite communication system to cover an initial predetermined coverage area; wherein said initial constellation phase of said satellite communication system comprises a first GEO satellite; and wherein said first GEO satellite is configured to carry an initial communication traffic for said initial predetermined coverage area;

(B) building said first GEO satellite for said initial constellation phase of said GEO satellite communication system;

(C) launching said first GEO satellite to fill said initial constellation phase of said GEO satellite communication system;

(D1) selecting a percentage point of an initial communication phase traffic intensity for said initial predetermined coverage area covered by said initial constellation phase of said GEO satellite communication system;

(D2) calculating an initial maximum number of subscribers in said initial predetermined coverage area covered by said initial constellation phase of said GEO satellite communication system;

(D3) selecting a subscription fee per month of coverage; and (D4) calculating said initial revenue stream generated by said initial constellation phase of said GEO satellite communication system.

23. The method of claim 22, wherein said step (D1) of selecting said percentage point of said initial communication traffic intensity for said initial predetermined coverage area covered by said initial constellation phase of said GEO satellite communication system further comprises the step of:

(D1, 1) selecting a Y percentage point of said initial communication traffic intensity for said initial predetermined coverage area covered by said initial constellation phase of said GEO satellite communication system.

24. A method of incrementally increasing a revenue stream generated by an incrementally built satellite communication system, said satellite communication system comprising a plurality of Geostationary (GEO) satellites, said method comprising the steps of:

(A) planning an initial constellation phase of said GEO satellite communication system to cover an initial predetermined coverage area; wherein said initial constellation phase of said satellite communication system comprises a first GEO satellite; and wherein said first GEO satellite is configured to carry an initial communication traffic for said initial predetermined coverage area;

(B) building said first GEO satellite for said initial constellation phase of said GEO satellite communication system;

(C) launching said first GEO satellite to fill said initial constellation phase of said GEO satellite communication system;

(D) collecting an initial revenue stream generated by said initial constellation phase of said GEO satellite communication system;

(F) planning a second constellation phase of said GEO satellite communication system to cover a second predetermined coverage area; wherein said second constellation phase of said GEO satellite communication system comprises said first GEO satellite and a second GEO satellite; and wherein said second constellation phase of said GEO satellite communication system is substantially completed to carry a second phase communication traffic for said second predetermined coverage area;

(G) building said second GEO satellite for said second constellation phase of said GEO satellite communication system;

(H) launching said second GEO satellite to fill said second constellation phase of said GEO satellite communication system; and (I) collecting a second revenue stream generated by said second constellation phase of said GEO satellite communication system; wherein said second revenue stream is used to offset the cost of building of a subsequent constellation phase of said GEO satellite communication system.

25. A data processing system for incrementally increasing a revenue stream generated by an incrementally built satellite communication system, said satellite communication system comprising a plurality of satellites, said data processing system comprising:
- (A1) a means for planning a satellite configured to provide a predetermined percentage point of a full communication traffic capacity of a substantially completed satellite communication system, wherein said satellite is selected from the group consisting of:{a small LEO satellite; a large LEO satellite; and a GEO satellite };
- (B) a means for processing an initial revenue stream generated by said initial constellation phase of said satellite communication system; and
- (C) a means for planning a subsequent constellation phase of said satellite communication system.

26. A data processing system for incrementally increasing a revenue stream generated by an incrementally built satellite communication system, said satellite communication system comprising a plurality of satellites, said data processing system comprising:
- (A2) an artificial intelligence means configured to select a predetermined percentage point of a full communication traffic capacity that is substantially sufficient for an initial coverage of an initial predetermined coverage area;
- (B) a means for processing an initial revenue stream generated by said initial constellation phase of said satellite communication system; and
- (C) a means for planning a subsequent constellation phase of said satellite communication system.

27. A data processing system for incrementally increasing a revenue stream generated by an incrementally built satellite communication system, said satellite communication system comprising a plurality of satellites, said data processing system comprising:
- (A) a means for planning an initial constellation phase of said satellite communication system, said initial constellation phase of said satellite communication system configured to cover an initial predetermined coverage area; wherein said initial constellation phase of said satellite communication system comprises an initial number of satellites; and wherein said initial constellation phase of said satellite communication system is substantially completed to carry an initial communication traffic for said initial predetermined coverage area;
- (B1) a means for selecting a percentage point of an initial communication phase traffic intensity for said initial predetermined coverage area covered by said initial constellation phase of said satellite communication system;
- (B2) a means for calculating an initial maximum number of subscribers in said initial predetermined coverage area covered by said initial constellation phase of said satellite communication system;
- (B3) a means for selecting a subscription fee per month of coverage;
- (B4) a means for calculating said initial revenue stream generated by said initial constellation phase of said satellite communication system; and
- (C) a means for planning a subsequent constellation phase of said satellite communication system.

28. A data processing system for incrementally increasing a revenue stream generated by an incrementally built satellite communication system, said satellite communication system comprising a plurality of satellites, said data processing system comprising:
- (A) a means for planning an initial constellation phase of said satellite communication system, said initial constellation phase of said satellite communication system configured to cover an initial predetermined coverage area; wherein said initial constellation phase of said satellite communication system comprises an initial number of satellites; and wherein said initial constellation phase of said satellite communication system is substantially completed to carry an initial communication traffic intensity for said initial predetermined coverage area;
- (B5) an artificial intelligence means configured to select a percentage point of said initial communication phase traffic intensity for said initial predetermined coverage area covered by said initial constellation phase of said satellite communication system;
- (B6) a computer means configured to calculate said initial maximum number of subscribers in said initial predetermined coverage area covered by said initial constellation phase of said satellite communication system;
- (B7) an artificial intelligence means configured to select said subscription fee per month of coverage based on a plurality of said coverage area data selected from the group consisting of {an average level of income; an average mobile phone subscription fee; and a number of available mobile phone subscription services};
- (B8) a computer means configured to calculate said initial revenue stream generated by said initial constellation phase of said satellite communication system; and
- (C) a means for planning a subsequent constellation phase of said satellite communication system.

* * * * *